US011272563B2

(12) United States Patent
Harris et al.

(10) Patent No.: US 11,272,563 B2
(45) Date of Patent: Mar. 8, 2022

(54) SELECTIVE PROPRIETARY PROTOCOL SUPPORT INDICATION REMOVAL

(71) Applicant: NOKIA SOLUTIONS AND NETWORKS OY, Espoo (FI)

(72) Inventors: John Harris, Whitefish Bay, WI (US); Antti Matti Juhani Kuurne, Madrid (ES); Patrycja Bukowiecka, Wroclaw (PL)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 15/759,375

(22) PCT Filed: Sep. 9, 2016

(86) PCT No.: PCT/EP2016/071284
§ 371 (c)(1),
(2) Date: Mar. 12, 2018

(87) PCT Pub. No.: WO2017/042324
PCT Pub. Date: Mar. 16, 2017

(65) Prior Publication Data
US 2018/0184481 A1    Jun. 28, 2018

Related U.S. Application Data

(60) Provisional application No. 62/216,814, filed on Sep. 10, 2015.

(51) Int. Cl.
*H04W 76/27* (2018.01)
*H04W 36/00* (2009.01)
(Continued)

(52) U.S. Cl.
CPC ........ *H04W 76/27* (2018.02); *H04W 36/0011* (2013.01); *H04W 36/0022* (2013.01); *H04W 76/30* (2018.02); *H04W 92/20* (2013.01)

(58) Field of Classification Search
USPC ......................................................... 370/331
See application file for complete search history.

(56) References Cited

U.S. PATENT DOCUMENTS

| 9,392,504 B2* | 7/2016 | Kitazoe ............ H04W 36/0055 |
| 2002/0098864 A1* | 7/2002 | Mukai ................ H04B 1/0003 |
| | | 455/552.1 |

(Continued)

FOREIGN PATENT DOCUMENTS

| CN | 1367597 A | 9/2002 |
| EP | 1 227 598 A2 | 7/2002 |

(Continued)

OTHER PUBLICATIONS

Mar. 4, 2019 Office Action issued in Japanese Patent Application No. 2018-530970.

(Continued)

*Primary Examiner* — Alpus Hsu
*Assistant Examiner* — Hooman Houshmand
(74) *Attorney, Agent, or Firm* — Squire Patton Boggs (US) LLP

(57) ABSTRACT

Various communication systems may benefit from appropriate indication of support for communication protocols. In particular, certain wireless systems that use handover may use selective proprietary protocol support indication removal. A method can include determining protocol support based on a first configuration received from the source access node. The method can also include determining whether to continue, after a handover, using a proprietary protocol based on whether a first configuration remains unchanged. The method can further include using or ceasing from using the proprietary protocol based on the determination.

12 Claims, 9 Drawing Sheets

(51) Int. Cl.
*H04W 76/30* (2018.01)
*H04W 92/20* (2009.01)

(56) References Cited

U.S. PATENT DOCUMENTS

| | | | | |
|---|---|---|---|---|
| 2009/0046656 | A1* | 2/2009 | Kitazoe | H04W 36/30 |
| | | | | 370/331 |
| 2010/0111039 | A1* | 5/2010 | Kim | H04W 52/0225 |
| | | | | 370/331 |
| 2012/0185578 | A1* | 7/2012 | Perkuhn | H04L 65/1016 |
| | | | | 709/223 |
| 2012/0287902 | A1* | 11/2012 | Bute | H04W 36/0055 |
| | | | | 370/331 |
| 2013/0039287 | A1* | 2/2013 | Rayavarapu | H04W 68/005 |
| | | | | 370/329 |
| 2013/0152115 | A1 | 6/2013 | Albal et al. | |
| 2013/0210422 | A1* | 8/2013 | Pani | H04W 48/16 |
| | | | | 455/423 |
| 2013/0230024 | A1* | 9/2013 | Lim | H04W 36/14 |
| | | | | 370/331 |
| 2013/0324075 | A1 | 12/2013 | Andrianov et al. | |
| 2014/0187224 | A1* | 7/2014 | Liu | H04W 24/02 |
| | | | | 455/418 |
| 2014/0342716 | A1 | 11/2014 | Harris et al. | |
| 2015/0023340 | A1* | 1/2015 | Lin | H04L 12/4625 |
| | | | | 370/338 |
| 2016/0127754 | A1 | 5/2016 | Lee et al. | |
| 2016/0295613 | A1* | 10/2016 | Wager | H04W 72/042 |

FOREIGN PATENT DOCUMENTS

| | | |
|---|---|---|
| JP | 2012-527799 A | 11/2012 |
| WO | 2010/133239 A1 | 11/2010 |
| WO | WO 2011/072726 A1 | 6/2011 |
| WO | 2013182561 A1 | 12/2013 |
| WO | 2014200242 A1 | 12/2014 |
| WO | WO 2014/209204 A1 | 12/2014 |

OTHER PUBLICATIONS

Japanese Office Action application No. 2017-565130 dated Jan. 9, 2019.
International Search Report & Written Opinion dated Nov. 18, 2016 corresponding to International Patent Application No. PCT/EP2016/071284.
Alcatel-Lucent, "Solutions for eNB release handling," 3GPP Draft; R2-096822, 3GPP TSG RAN WG2 #68, Jeju, Korea, Nov. 3, 2009, XP050391267.
Alcatel-Lucent, "Full configuration solution for eNB release handling," 3GPP Draft; R2-101379, 3GPP TSG-RAN WG2 Meeting #69, San Francisco, CA, USA, Feb. 16, 2010, XP050421802.
3GPP TS 36.331 V12.6.0 (Jun. 2015), Technical Specification, 3rd Generation Partnership Project; Technical Specification Group Radio Access Network; Evolved Universal Terrestrial Radio Access (E-UTRA); Radio Resource Control (RRC); Protocol specification (Release 12), Jun. 2015.
Examination Report dated Feb. 28, 2020 corresponding to Indian Patent Application No. 201817005002, and English translation thereof.
Korean Notice to File a Response corresponding to KR Appln. No. 10-2018-7010025, dated Nov. 19, 2019.
Chinese Office Action corresponding to CN Appln. No. 201680052370.7, dated Mar. 26, 2020.
Communication pursuant to Article 94(3) EPC dated Jul. 10, 2020 corresponding to European Application No. 16763049.0.

* cited by examiner

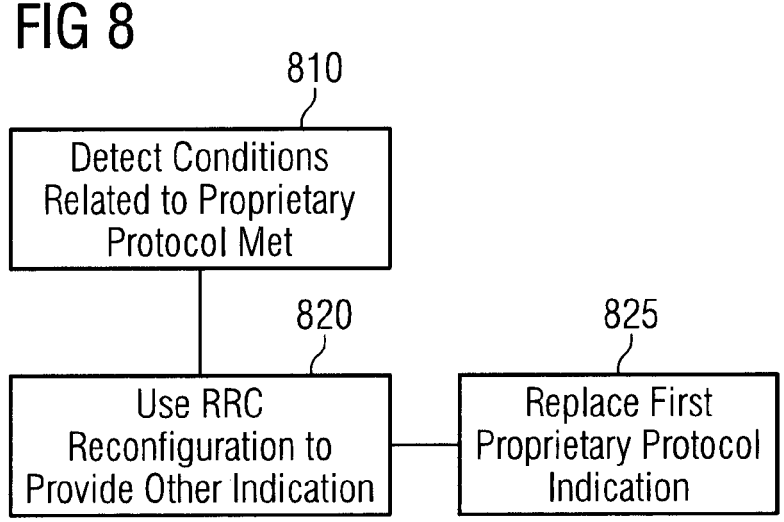
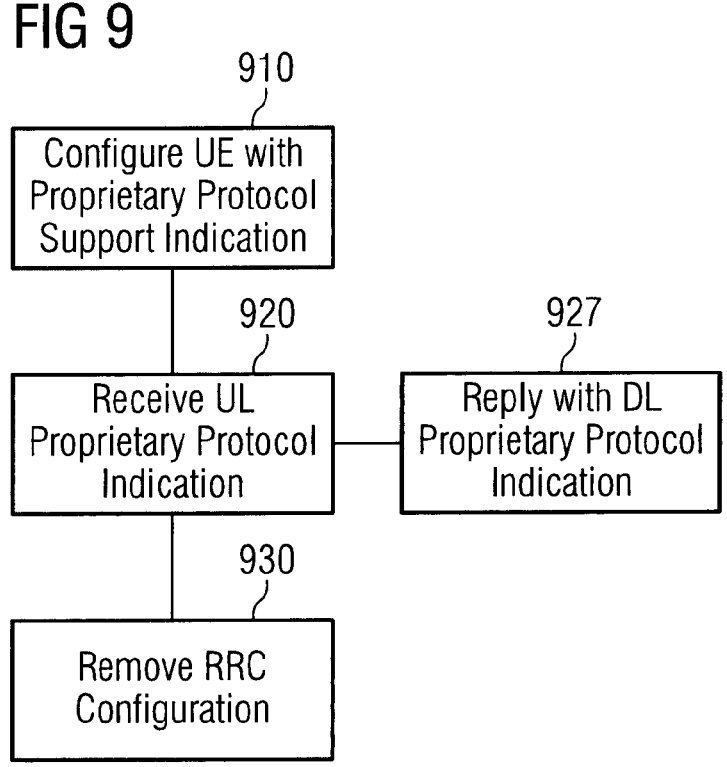

FIG 10
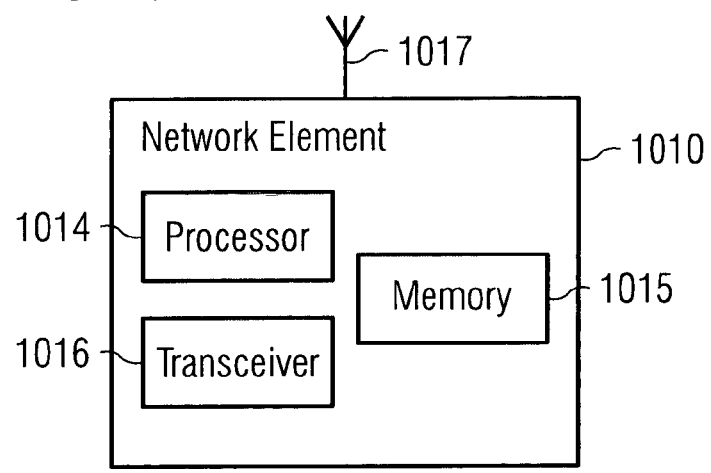
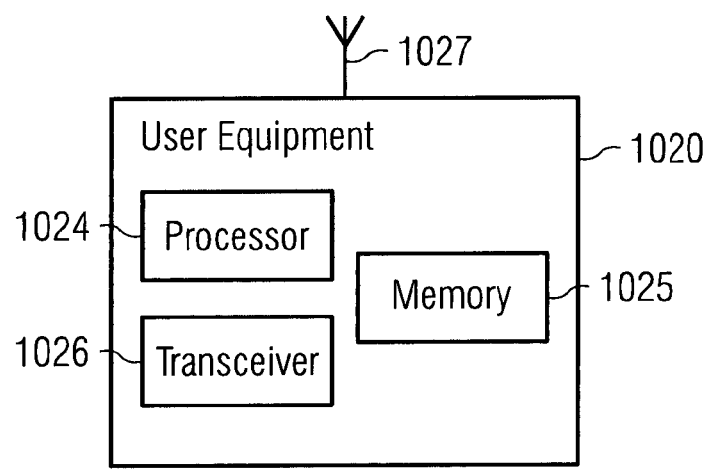

SELECTIVE PROPRIETARY PROTOCOL SUPPORT INDICATION REMOVAL

CROSS-REFERENCE TO RELATED APPLICATION

This application is related to and claims the benefit and priority of U.S. Provisional Patent Application No. 62/216,814, filed Sep. 10, 2015, the entirety of which is hereby incorporated herein by reference.

BACKGROUND

Field

Various communication systems may benefit from appropriate indication of support for communication protocols. In particular, certain wireless systems that use handover may use selective proprietary protocol support indication removal.

Description of the Related Art

When supporting a proprietary wireless protocol between an evolved Node B (eNB) and a user equipment (UE), it may be possible to indicate this proprietary protocol support to the UE through one or more mechanisms where the UE is sent a special message, for example, over radio resource control (RRC) signaling. In one example, this mechanism may involve using a specific RRC configuration/indicated in L2 or L3 layer signaling, where the parameter settings are set in a particularly unique fashion that is not expected to be used by any normal eNB. The RRC configuration can refer to configuration for an RRC event. Other mechanisms for indicating the proprietary protocol support through a special configuration are possible.

When a UE with such a proprietary configuration is handed off to a neighboring eNB, it may be unknown as to whether the neighboring eNB also supports this proprietary protocol. Upon handoff, the neighboring eNB may be notified through standardized existing signaling, of the existing UE configurations, such as an RRC configuration.

SUMMARY

According to a first embodiment, a method can include determining protocol support based on a first configuration received from the source access node. The method can also include determining whether to continue, after a handover, using a proprietary protocol based on whether a first configuration remains unchanged. The method can further include using or ceasing from using the proprietary protocol based on the determination.

In variant, the method can include ceasing from using the proprietary protocol when the first configuration remains unchanged by a handoff command.

In a variant, the method can include subsequently receiving a second configuration indicating the proprietary protocol support, and using the proprietary protocol again based on the received second configuration.

In a variant, the method can include using the proprietary protocol upon receiving a configuration after the handoff indicating support of the proprietary protocol.

In a variant, the second configuration can be the same as the first configuration.

In a variant, the method can further comprise receiving a downlink proprietary medium access control message and deleting an RRC configuration.

In a variant, the second configuration can be different from the first.

In a variant, when the second configuration is different from the first configuration, the second configuration can be considered valid if the MeasId is not activated.

According to a second embodiment, a method can include detecting that a first access node supports a proprietary protocol, that a user equipment is performing handoff the first access node, and the user equipment's existing RRC configuration contains a first proprietary protocol indication. The method can also include using a radio resource control reconfiguration to provide another proprietary protocol indication to the user equipment.

In a variant, the providing another proprietary protocol indication can include replacing the first proprietary protocol indication.

In a variant, the method can include refraining from activating another RRC configuration.

In a variant, the second configuration can be the same as the first configuration.

In a variant, the second configuration can be different from the first configuration.

In a variant, the second configuration does not activate the MeasId.

According to a third embodiment, a method can include configuring, by an access node, a user equipment with a first proprietary protocol support indication configuration. The method can also include, when the access node receives an uplink proprietary protocol indication, removing the RRC configuration, wherein this removal is done without performing any radio resource control reconfiguration over the air.

In a variant, in response to the access node receiving the uplink proprietary protocol indication, replying, by the access node, with a downlink medium access control message in order to confirm to the user equipment that the proprietary protocol indication has been silently deleted.

According to fourth through sixth embodiments, an apparatus can include means for performing the method according to the first through third embodiments respectively, in any of their variants.

According to seventh through ninth embodiments, an apparatus can include at least one processor and at least one memory and computer program code. The at least one memory and the computer program code can be configured to, with the at least one processor, cause the apparatus at least to perform the method according to the first through third embodiments respectively, in any of their variants.

According to tenth through twelfth embodiments, a computer program product may encode instructions for performing a process including the method according to the first through third embodiments respectively, in any of their variants.

According to thirteen through fifteenth embodiments, a non-transitory computer readable medium may encode instructions that, when executed in hardware, perform a process including the method according to the first through third embodiments respectively, in any of their variants.

According to sixteenth and seventeenth embodiments, a system may include at least one apparatus according to the fourth or seventh embodiments in communication with at least one apparatus according to the fifth, sixth, eighth, or ninth embodiments, respectively in any of their variants.

BRIEF DESCRIPTION OF THE DRAWINGS

For proper understanding of the invention, reference should be made to the accompanying drawings, wherein:

FIG. 8 illustrates another method according to certain embodiments.

FIG. 9 illustrates a further method according to certain embodiments.

FIG. 10 illustrates a system according to certain embodiments.

DETAILED DESCRIPTION

Once the UE is in the new/neighboring eNB, the proprietary UE configuration may cause some specific issues. For example, in one potential scenario, the neighboring eNB may utilize the RRC configuration it received upon handoff, and then (re)configure the UE with that RRC configuration. This would confuse the UE as the UE would interpret that RRC configuration as indicating that the eNB is supporting the proprietary protocol. This can then be an issue as the UE could then potentially start transmitting proprietary signaling to a standard eNB, with unpredictable results when that standard eNB receives the proprietary/nonstandard signaling.

Figure 1:
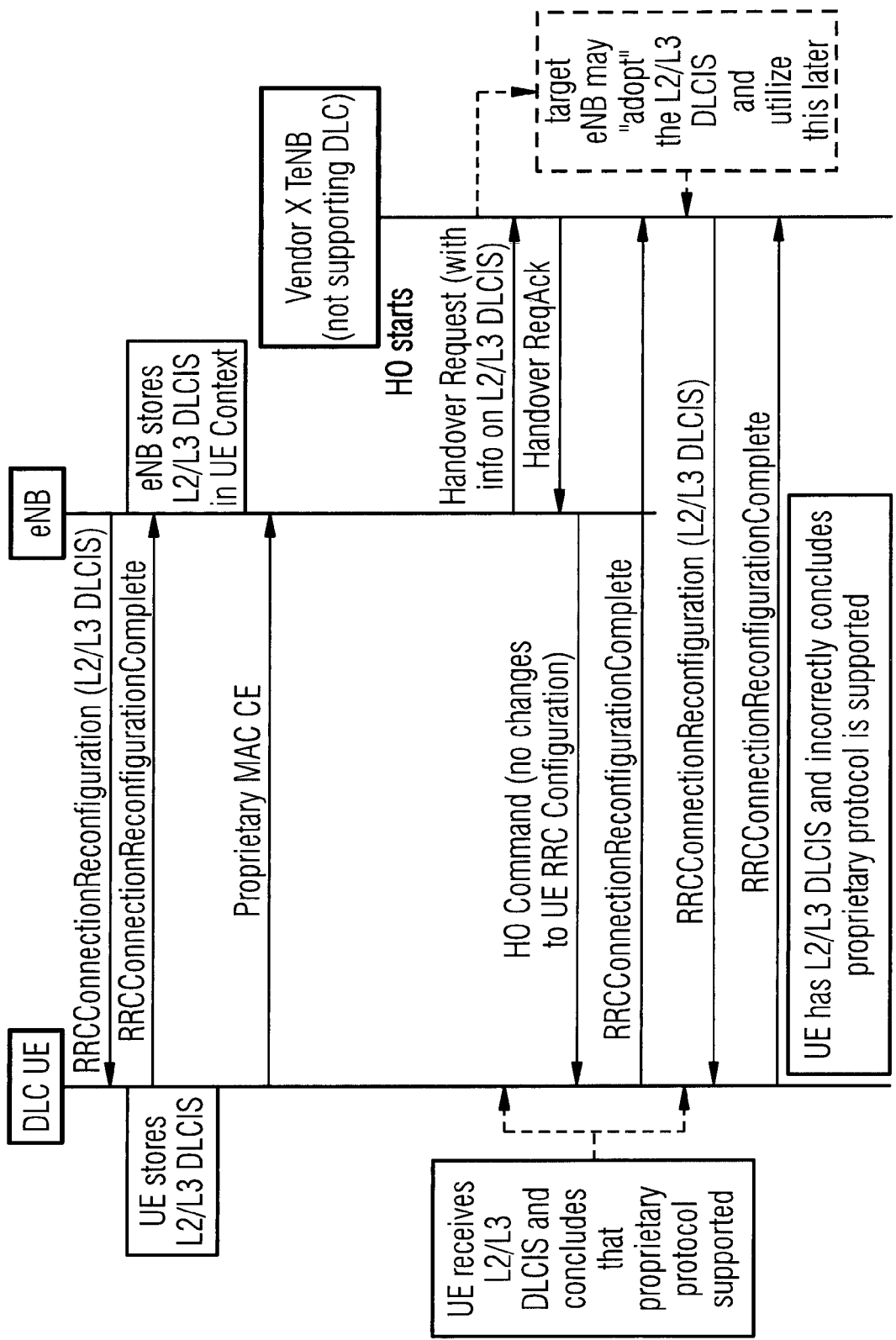
FIG. 1 illustrates a scenario in which a user equipment may incorrectly determine that a target access node supports an unsupported proprietary protocol.

FIG. 1 illustrates a scenario in which a user equipment may incorrectly determine that a target access node supports an unsupported proprietary protocol. As shown in FIG. 1, after handoff UE may believe a new eNB supports proprietary protocol, when in fact the new eNB does not. As shown in FIG. 1, a Data Loading Control UE can be configured with an RRC connection reconfiguration having an RRC Data Loading Control Information Signal (DLCIS). The UE may respond with an RRC connection reconfiguration complete. The UE may then store RRC DLCIS and the eNB may store RRC DLCIS in UE context. The UE can then use a proprietary medium access control (MAC) message.

Data loading control information signals can broadly refer to the kinds of information signals, such as MAC, RRC, and other air interface signaling, described by way of example in U.S. Patent Application Publication No. 2013/0324075, titled, "Data Loading Control," the entirety of which is hereby incorporated herein by reference. Any suitable information signal utilizing MAC/RRC may be employed as a data loading control information signal.

Subsequently a handover (HO) can start to a Vendor X enB that does not support Data Loading Control. A handover request may be provided with information on RRC DLCIS and the target eNB may acknowledge this request. Meanwhile, the UE can receive a handover command with no changes to the RRC configuration and can signal that RRC connection reconfiguration is complete. When the target eNB sends its RRC connection reconfiguration message, the target eNB may adopt and use the source RRC DLCIS configuration. Thus, the UE may incorrectly conclude that the target eNB supports the proprietary protocol(s).

Certain embodiments may address the above-described situation and avoid the issues described therein. For example, in certain embodiments, a user equipment may ignore the proprietary configuration (e.g. configuration indicated in L2 or L3 layer/RRC) received during handoff. Alternatively, an access node, such as an eNB, can silently delete the proprietary configuration (e.g. RRC configuration) from storage and not provide the proprietary configuration signal to a target node during a handover process. In a further alternative, the target node may switch to another or different proprietary configuration signal that also indicates use of the proprietary protocol.

Figure 2:
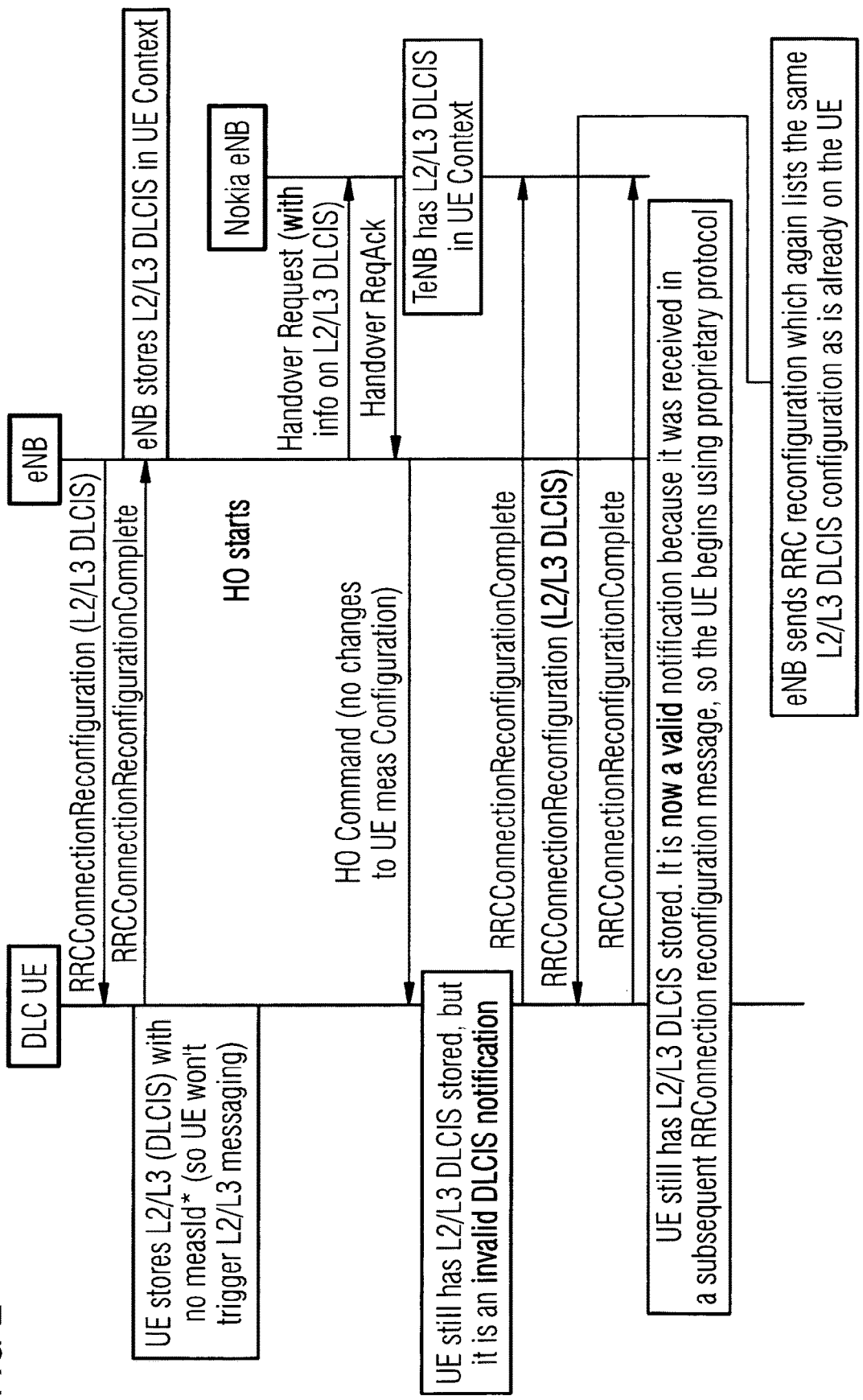
FIG. 2 illustrates an approach in which a user equipment ignores RRC received during handoff, according to certain embodiments.

FIG. 2 illustrates an approach in which a user equipment ignores RRC received during handoff, according to certain embodiments. This approach may differ from the approach shown in FIG. 1, in that the UE may initially treat the RRC configuration as invalid at handover. Thus, the UE may wait until the target eNB sends a subsequent RRC DLCIS and then store the RRC DLCIS and treat the notification as valid.

In summary, in this approach the UE may not consider an RRC received during handoff as a valid protocol indication RRC. The UE may only begin using the proprietary protocol if then later the UE receives a configuration for the proprietary protocol during a separate/subsequent RRC reconfiguration.

For example, the UE and the eNB may not silently remove the RRC. Similarly, the eNB is not required to remove the RRC configuration from the UE.

In certain embodiments, a Data Loading Control UE would require a second RRC reconfiguration (carrying a configuration) in the target cell, before the RRC configuration received is considered valid. Here, a Data Loading Control UE is used as an example of a UE running a proprietary protocol. There is no requirement that a user equipment be specifically Data Loading Control.

When the Data Loading Control UE receives RRC configuration as a part of the handoff procedure, the UE may refrain from using the RRC configured by this message as evidence that the target eNB supports the Data Loading Control protocol.

Instead, after handoff, the UE can require a second RRC reconfiguration in that target cell, before considering the RRC configuration received as valid evidence that the target eNB supports the Data Loading Control protocol.

A UE that is not configured to identify Data Loading Control protocol support from the RRC configuration may not use this RRC handoff configuration. Thus, even if a neighboring cell provides that RRC configuration to the non-configured UE as a part of handoff, that will not cause any problems with the non-configured UE. As such, the eNB is also not required to use RRC reconfiguration to remove the proprietary configuration from the non-configured UEs.

Figure 3:
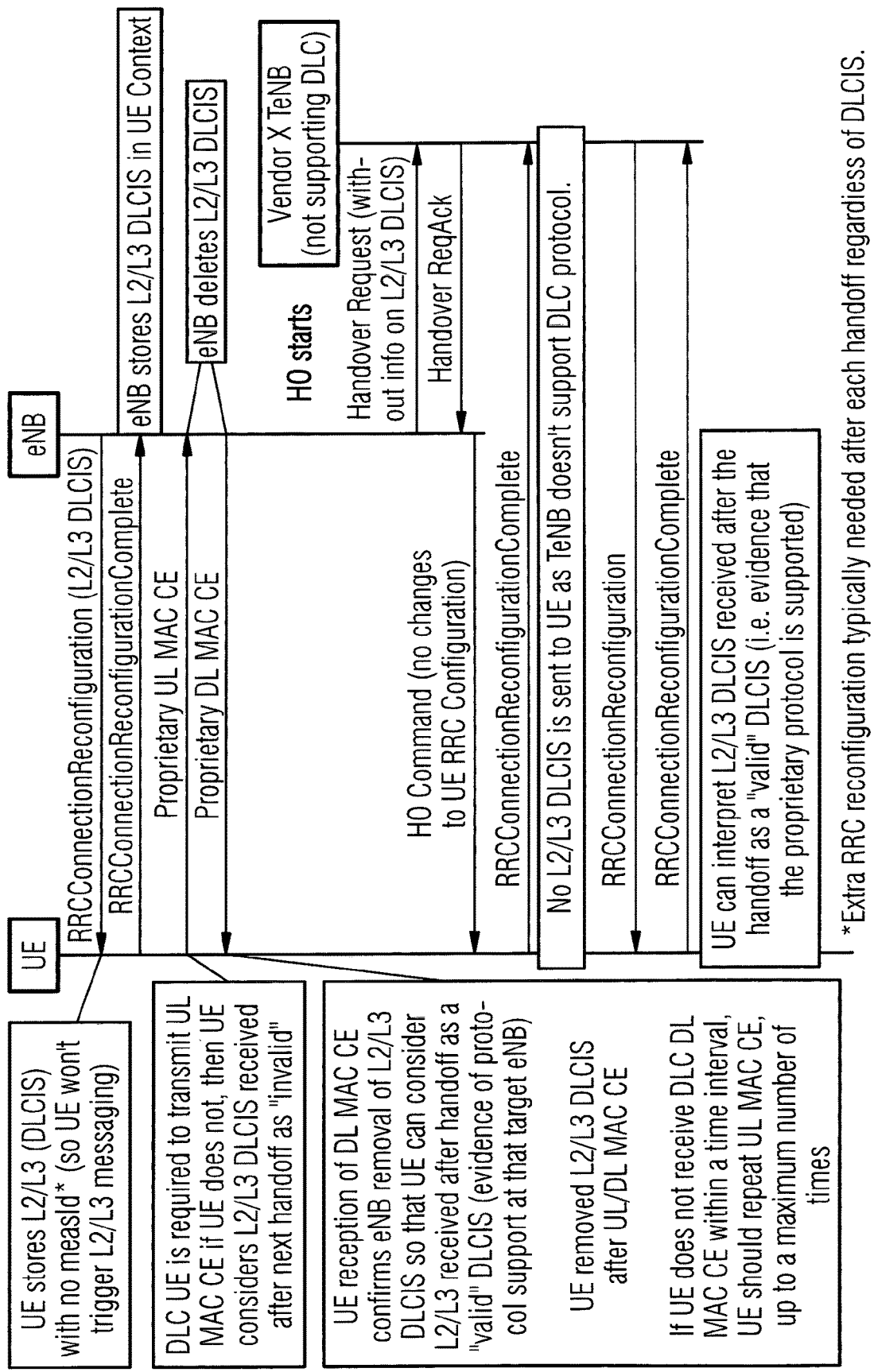
FIG. 3 illustrates an approach in which in which silent deletion is implemented, according to certain embodiments.
Figure 4:
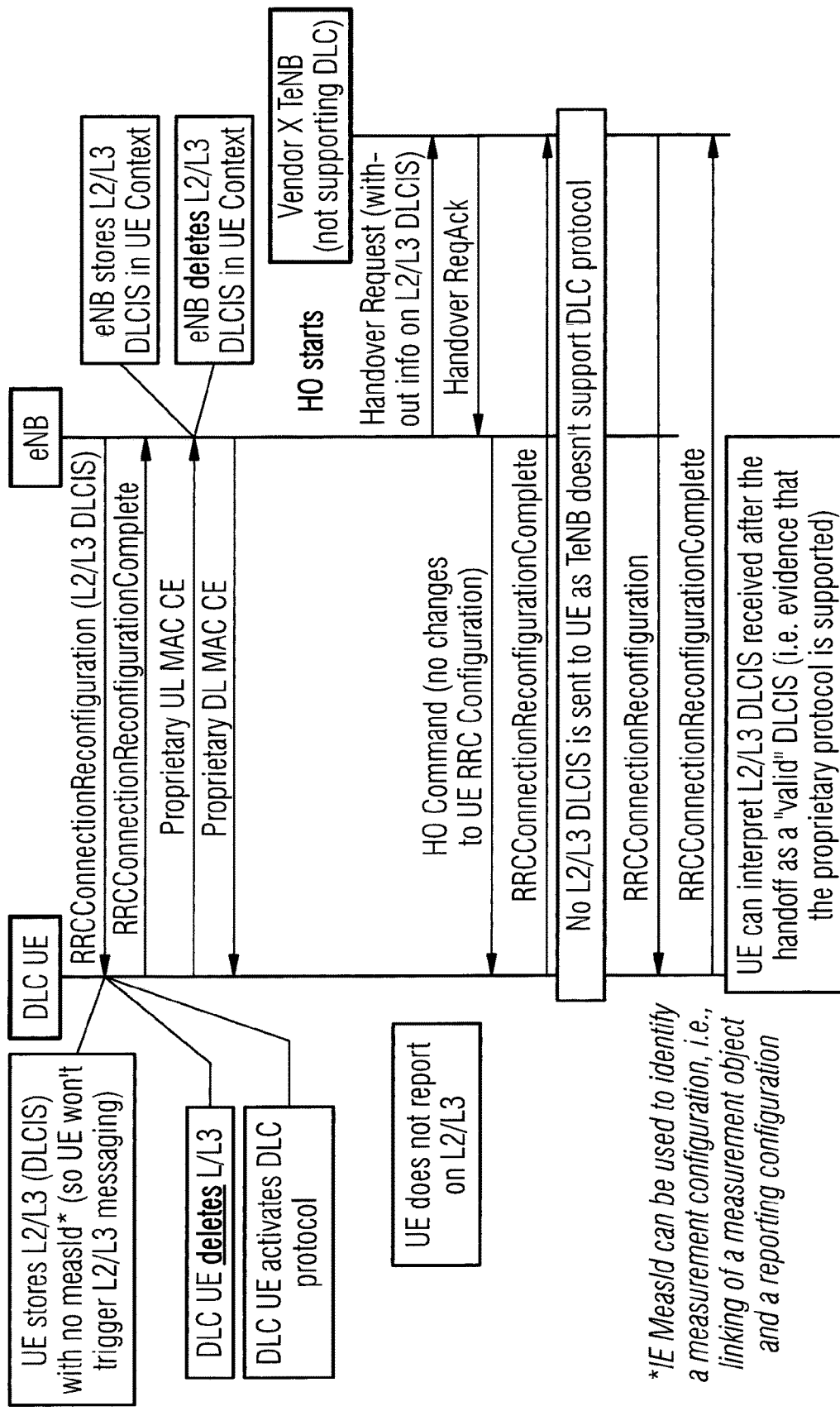
FIG. 4 illustrates an approach in which silent deletion is implemented except when the target access node supports the proprietary protocol, according to certain embodiments.

FIG. 3 illustrates an approach in which in which silent deletion is implemented, according to certain embodiments. Similarly, FIG. 4 illustrates one example approach in which silent deletion is implemented except when the target access node supports the proprietary protocol. The embodiments illustrated in FIGS. 3 and 4 are just examples of certain embodiments and their features should not be taken as being required in all cases.

In these approaches, the first downlink proprietary MAC message can serve as a confirmation to the UE that the network has deleted the RRC configuration. If the UE does not receive this confirmation, then the network may still be using the RRC configuration. After the UE completes handoff, if the UE receives the RRC message, it may refrain from using the Data Loading Control protocol.

Optionally, if the UE does not receive a proprietary downlink MAC message, then the UE may repeat the uplink proprietary MAC message up to a maximum number of repetitions.

The Data Loading Control UE can be configured to transmit the uplink MAC message in response to receiving the RRC Data Loading Control Information Signal. This can help to avoid a scenario in which the UE is unable to use Data Loading Control after handing off into a new eNB where Data Loading Control is supported.

If the eNB receives an uplink proprietary protocol indication, for example an uplink proprietary MAC message, the eNB can do various things. First, the eNB can silently remove the RRC configuration. This removal can be a removal from storage within the eNB and possibly provided during handoff. This removal can be done without performing any RRC reconfiguration over the air. The eNB can reply with a downlink MAC message in order to confirm to the UE that the proprietary protocol indication (e.g. indication in layer L2 or L3) has been silently deleted, such that the UE can use the proprietary protocol after handoff, if it receives another proprietary protocol indication at that time.

In other words, the silent deletion can ensure that if the target access node sends a corresponding RRC DLCIS, this means that the target access node supports the proprietary protocol, rather than that the target access node is simply copying the stored information at the source access node.

If the UE transmits the uplink MAC message, but the source eNB never receives it, then this may create an issue in a case where the UE is not waiting for confirmation from the eNB. Thus, a downlink MAC message can be used as a confirmation that the network has received the uplink MAC message and has silently deleted.

If the UE has not received this confirmation, then the RRC may still be included in the handoff command. For this reason, if the UE does not receive a downlink proprietary MAC message then the UE can refrain from using the Data Loading Control protocol after the next handoff.

The configured UE can send an uplink proprietary MAC message. A justification of this uplink communication can that if the UE is a configured UE, and the UE never transmits an uplink MAC message, then there may still be a need for special behavior on the part of the eNB with respect to the RRC.

After all, a configured UE may potentially use the RRC received after handoff. If this RRC received after handoff is from a copying target access node rather than a configured access node, the configured UE may be confused. In particular, the configured UE may think that the target cell supports the Data Loading Control protocol, when actually the target cell does not.

If the UE is not a configured UE, and the eNB does not receive a proprietary MAC message, then no special behavior is required on the part of the eNB with respect to the proprietary protocol configuration.

In other words, the eNB is not required to remove a proprietary protocol configuration from the non-configured UE. Moreover, the eNB can assume that a UE which does not respond to the specific proprietary configuration with a proprietary MAC message is not a configured UE.

In a general, a non-configured UE may not use this RRC handoff configuration. Thus, even if a neighboring cell provides that RRC configuration to the non-configured UE, that will not cause any problems with the non-configured UE. As such, the eNB is not required to use RRC reconfiguration to remove the proprietary configuration from the non-configured UE, or indeed from any UE which does not respond to the RRC with a proprietary MAC message.

Figure 5:
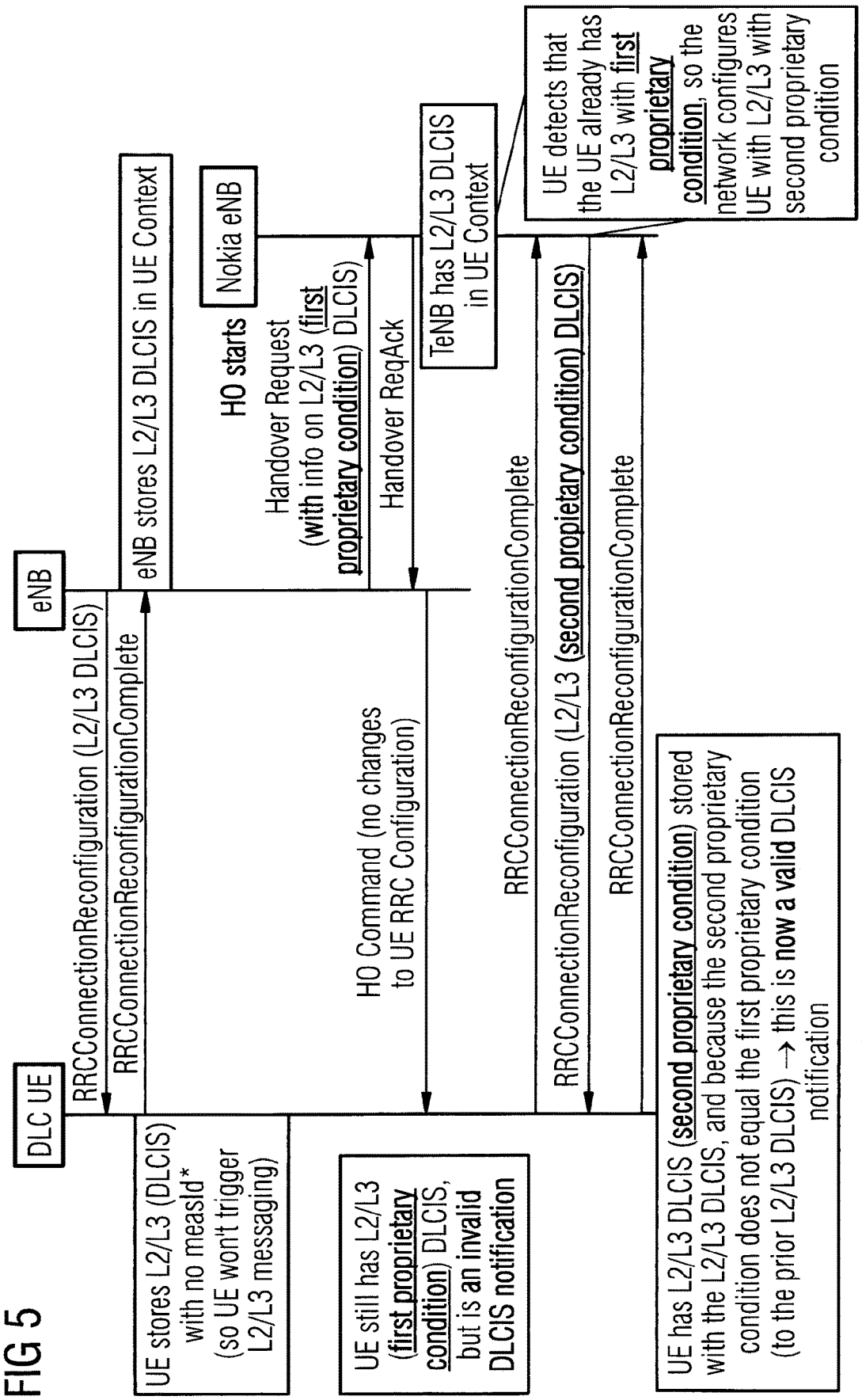
FIG. 5 illustrates toggling data loading control information signals after a handoff, according to certain embodiments.
Figure 6:
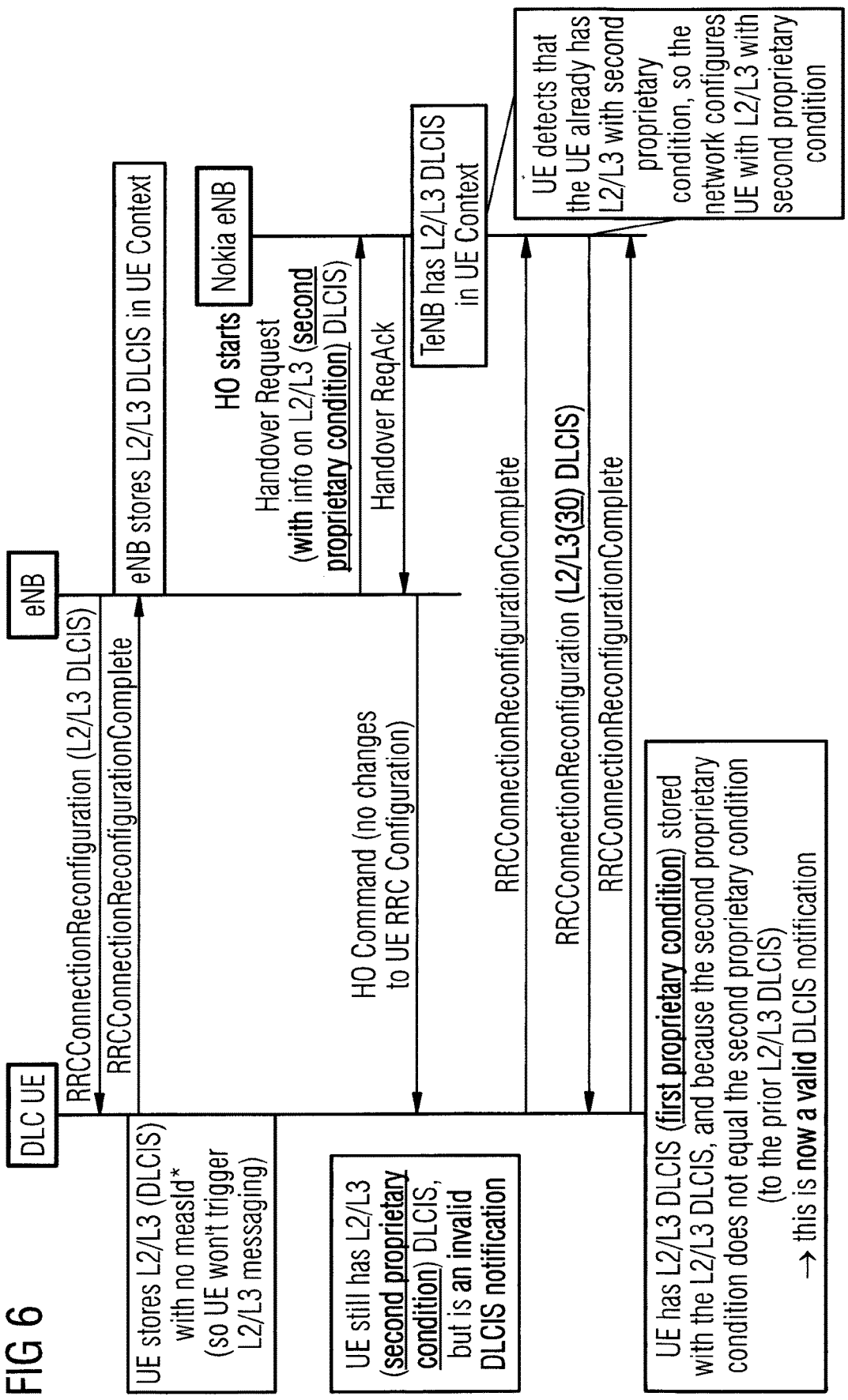
FIG. 6 illustrates toggling data loading control information signals in an opposite direction (to the direction in FIG. 5) after a handoff, in accordance with certain embodiments.

FIG. 5 illustrates toggling data loading control information signals after a handoff, according to certain embodiments, while FIG. 6 illustrates toggling data loading control information signals in an opposite direction after a handoff, also in accordance with certain embodiments. In these approaches, there can be changing from one flavor of the Data Loading Control Information Signal to a different one in the immediately subsequent cell after a handoff.

With the toggling approaches, there can be a second flavor of the RRC announcement. At least one of the parameters within the RRC Data Loading Control Information Signal can have two different possible values, where both values would indicate Data Loading Control protocol support.

If this was the case, then the target eNB could see the RRC configuration that was used in the source cell, as the target eNB would have received that RRC as a part of the handoff process. Then the target eNB could use a different/alternate RRC Data Loading Control Information Signal such that the UE can be confident that the RRC it was receiving was not a result of the RRC being transferred during handoff.

Thus, these approaches can toggle between two identical RRC configurations upon HO, with some minor difference between the two. For example, one RRC can have one proprietary configuration, and the other RRC can have a different proprietary configuration. Neither RRC can have a MeasId (see 3GPP TS 36.311, which is hereby incorporated herein by reference in its entirety) configured to activate the RRC configuration.

Figure 7:
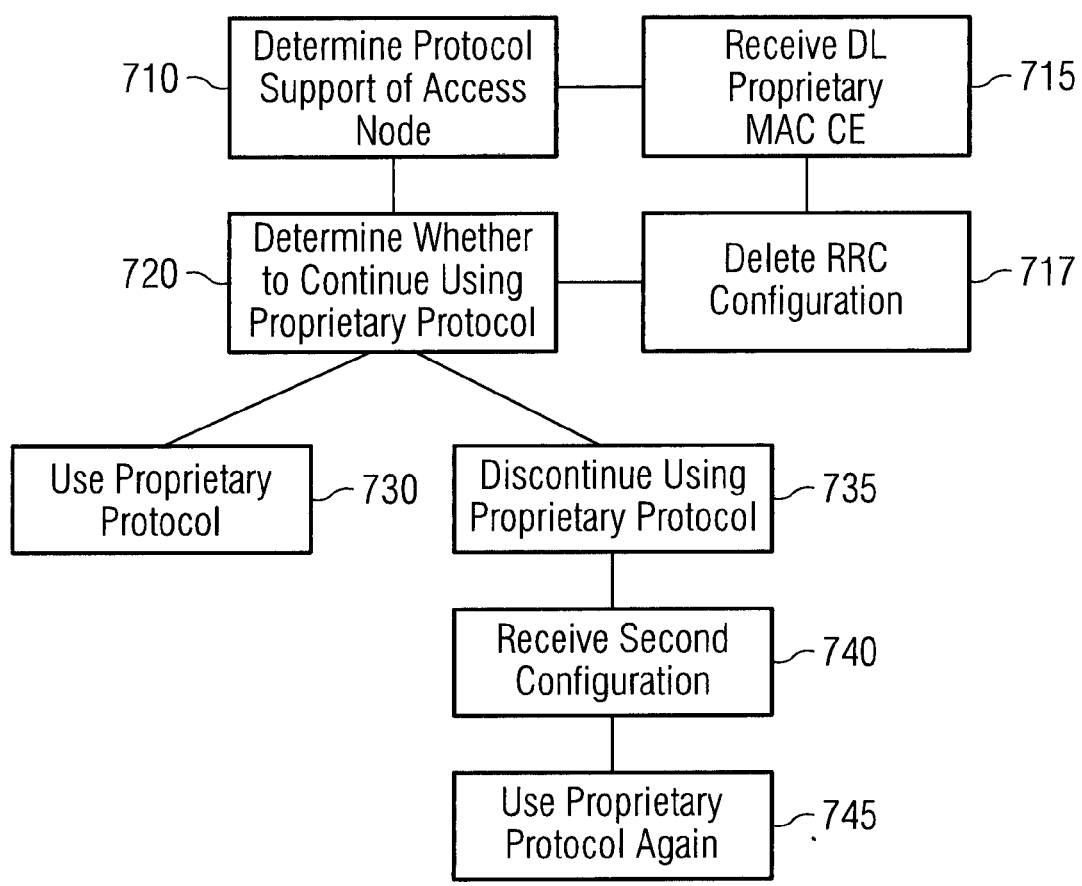
FIG. 7 illustrates a method according to certain embodiments.

FIG. 7 illustrates a method according to certain embodiments. This may be a method of enabling a UE to determine a level of eNB proprietary protocol support after handoff. The method can include, at 710, determining protocol support based on a first configuration received from the source access node. The source access node can be an eNB. The method can also include, at 720, determining whether to continue, after a handover, using a proprietary protocol based on whether a first configuration remains unchanged. The method can further include using, at 730, or ceasing from using, at 735, the proprietary protocol based on the determination.

The ceasing from using the proprietary protocol can occur when the first configuration remains unchanged by a handoff command. This may correspond to the user equipment detecting that the target access node is simply copying the source access node.

The method can include, at 740, subsequently receiving a second configuration indicating the proprietary protocol support. This may be received from the target eNB. The method can further include, at 745, using the proprietary protocol again based on the received second configuration.

The method can include using the proprietary protocol upon receiving a configuration after the handoff indicating support of the proprietary protocol. This may be the first time after handoff or the second or subsequent time after handoff.

The second configuration can be the same as the first configuration. In this approach, an additional RRC may be required after handoff, as described above.

The method can further include, at 715, receiving by the UE a downlink proprietary medium access control message and, at 717, deleting the RRC configuration. In this case, because the RRC is deleted, the first configuration will no longer still be in place.

The second configuration can be different from the first. When the second configuration is different from the first configuration, the second configuration can be considered valid if the MeasId is not activated. In this case, the fact that this is not activated, is a further clue that this configuration is not being used in the normal fashion. Instead, it is being used to indicate the proprietary protocol support.

FIG. 8 illustrates another method according to certain embodiments. This may be a method of enabling an eNB to indicate proprietary protocol support to a UE, with special handling for handoff. The method can include, at 810, detecting that a first access node (eNB) supports a proprietary protocol, that a user equipment is performing handoff the first access node, and the user equipment's existing DLCI contains a first proprietary protocol indication. The method can also include, at 820, using a radio resource control reconfiguration to provide another proprietary protocol indication to the user equipment.

The providing another proprietary protocol indication can include, at 825, replacing the first proprietary protocol indication. The method can include refraining from activating another configuration. As mentioned above, this lack of activation can help to verify the purpose of the first proprietary protocol indication.

The second configuration can be the same as the first configuration. This may be the case in an embodiment in which the same RRC signal is again provided after handoff, as described above.

Alternatively, the second configuration can be different from the first configuration. This may corresponding to the toggling embodiments described above.

The second configuration may not activate the MeasId. Thus the RRC configuration may not be activated. This can provide an additional check, as mentioned above.

FIG. 9 illustrates a further method according to certain embodiments. This may be a method of enabling the eNB to indicate proprietary protocol support to a UE, with special handling for handoff. The method can include, at 910, configuring, by an access node, such as an eNB, a user equipment with a first proprietary protocol support indication configuration. This configuration may be, for example, a special RRC configuration. The method can also include, when the access node receives an uplink proprietary protocol indication at 920, removing at 930 the RRC configuration, for example as stored within the eNB and possibly provided during handoff. The uplink proprietary protocol indication can be an uplink proprietary MAC message. The removal can be done without performing any radio resource control reconfiguration over the air.

In response to the access node receiving the uplink proprietary protocol indication, the method can include at 927 replying, by the access node, with a downlink medium access control message. This replay may confirm to the user equipment that the proprietary protocol indication, such as the RRC configuration, has been silently deleted. Thus, the UE can use the data loading control/proprietary protocol after handoff if the UE receives another proprietary protocol indication at that time. This may then avoids the issues illustrated in FIG. 1 where the configured UE could use Data Loading Control Protocol in response to a first Data Loading Control Information Signal that resulted from the first Data Loading Control Information Signal provided during handoff to that neighboring cell. In other words, a copy of the data loading control information signal received during handoff may not be evidence that the target eNB supports the protocol, may not be sufficient indication to the UE that it should use the proprietary protocol in that new target cell. Instead with this approach, the UE does not use the data loading control protocol until it receives a separate data loading control information signal, subsequent to handoff completing.

Thus, certain embodiments may include a variety of the above-described features as separate embodiments or in combination with one another. Moreover, other variations and combinations are also permitted.

For example, in certain embodiments the eNB can use over the air messaging to explicitly remove the RRC configuration from the UE. This may help to avoid any potential for problems when the UE is later handed off to another cell, where that other cell is quite possibly from another vendor and consequently may not support the same protocols.

Moreover, certain embodiments may automatically detect non-configured UEs. The non-configured UEs can be those UEs that are not configured to support the proprietary protocol. The system may use an explicit mechanism that can avoid problems for the non-configured UEs.

If, after the RRC announcement is configured, a Data Loading Control MAC message is not received, then a Data Loading Control UE can automatically self delete this RRC configuration. Furthermore, the eNB can automatically self delete this RRC configuration and not use over the air messaging to explicitly remove the RRC configuration.

This removal of the RRC prior to handoff can avoid the need to perform this removal during the handoff procedure. Either an implicit or explicit mechanism can be used to remove RRC well prior to handoff.

Additional triggers can be used by the UE and/or eNB. For example, if the UE hands-off within a particularly short time interval after the first MAC message, the Data Loading Control UE may ignore the RRC received after the next handoff as it may be resulting from the configured source eNB providing it to a non-configured target eNB.

The modified RRC Data Loading Control Information Signal criteria can have various characteristics. For example, reference signal received quality (RSRQ) can be selectively utilized instead of just reference signal received power (RSRP).

After the Data Loading Control Information Signal the UE may be prohibited from transmitting additional proprietary MAC message if more than a threshold number of proprietary MAC message are transmitted by the UE but no acknowledgment was received. This may help to prevent the configured UE from flooding a non-configured UE with proprietary MAC messages.

More generally, the protocol can begin with the network using a RRC configuration for proprietary connection/protocol with a very specific set of configuration parameters to indicate to the UE that the eNB supports the special proprietary protocol. Thus, this extra RRC configuration may not alter the UE performance. The special proprietary Data Loading Control UEs can know that this special RRC configuration indicates that the Data Loading Control protocol is supported by that eNB.

FIG. 10 illustrates a system according to certain embodiments of the invention. It should be understood that each block of the flowchart of FIGS. 7 through 9 may be implemented by various means or their combinations, such as hardware, software, firmware, one or more processors and/or circuitry. In one embodiment, a system may include several devices, such as, for example, network element 1010 and user equipment (UE) or user device 1020. The system may include more than one UE 1020 and more than one network element 1010, although only one of each is shown for the purposes of illustration. A network element can be an access point, a base station, an eNode B (eNB), or any other network element, such as any other access node. Each of these devices may include at least one processor or control unit or module, respectively indicated as 1014 and 1024. At least one memory may be provided in each device, and indicated as 1015 and 1025, respectively. The memory may include computer program instructions or computer code contained therein, for example for carrying out the embodiments described above. One or more transceiver 1016 and 1026 may be provided, and each device may also include an antenna, respectively illustrated as 1017 and 1027. Although only one antenna each is shown, many antennas and multiple antenna elements may be provided to each of the devices. Other configurations of these devices, for example, may be provided. For example, network element 1010 and UE 1020 may be additionally configured for wired communication, in addition to wireless communication, and in such a case antennas 1017 and 1027 may illustrate any form of communication hardware, without being limited to merely an antenna.

Transceivers 1016 and 1026 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. It should also be appreciated that according to the "liquid" or flexible radio concept, the operations and functionalities may be performed in different entities, such as nodes, hosts or servers, in a flexible manner. In other words, division of labor may vary case by case. One possible use is to make a network element to deliver local content. One or more functionalities may also be implemented as a virtual application that is provided as software that can run on a server.

A user device or user equipment 1020 may be a user equipment (UE) or a mobile station (MS) such as a mobile phone or smart phone or multimedia device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof. The user device or user equipment 1020 may be a sensor or smart meter, or other device that may usually be configured for a single location.

In an exemplifying embodiment, an apparatus, such as a node or user device, may include means for carrying out embodiments described above in relation to FIGS. 7 through 9.

Processors 1014 and 1024 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors. Additionally, the processors may be implemented as a pool of processors in a local configuration, in a cloud configuration, or in a combination thereof.

For firmware or software, the implementation may include modules or unit of at least one chip set (e.g., procedures, functions, and so on). Memories 1015 and 1025 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network element 1010 and/or UE 1020, to perform any of the processes described above (see, for example, FIGS. 7 through 9). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C #, Java, etc., or a low-level programming language, such as a machine language, or assembler. Alternatively, certain embodiments of the invention may be performed entirely in hardware.

Furthermore, although FIG. 10 illustrates a system including a network element 1010 and a UE 1020, embodiments of the invention may be applicable to other configurations, and configurations involving additional elements, as illustrated and discussed herein. For example, multiple user equipment devices and multiple network elements may be present, or other nodes providing similar functionality, such as nodes that combine the functionality of a user equipment and an access point, such as a relay node.

Certain embodiments may have various benefits and/or advantages. For example, certain embodiments may be suitable for implementation as a part of a proprietary knowledge sharing protocol. This mechanism can serve to enable the overall proprietary protocol. In addition, the specific protocol can further enable benefits such as avoiding the need to perform an extra RRC reconfiguration in the case where the UE is a configured UE. However, some embodiments of the invention can ensure that in the case of a non-configured UE, problems can be avoided by selectively performing the needed RRC reconfiguration in that case.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method, comprising:
   configuring, by an access node, a user equipment with a first protocol support indication configuration; and
   when the access node receives an uplink protocol indication from the user equipment, removing, by the access node, a radio resource control configuration,
   wherein the removal is done without performing any explicit radio resource control reconfiguration signaling,
   wherein the removal comprises replying with a downlink medium access control message, wherein the downlink medium access control message confirms that the radio resource control configuration has been deleted, wherein the downlink medium access control message is configured to cause the user equipment to wait to use a data loading control protocol in a new cell until the user equipment receives a separate data loading control information signal subsequent to handover to the new cell completing.

2. A computer program product embodied on a non-transitory computer readable medium encoded with instructions that, when executed in hardware, perform the method according to claim 1.

3. A method, comprising:
   determining, by a user equipment, protocol support based on a first configuration received from a source access node;
   determining, by the user equipment, whether to continue, after a handover, using a protocol based on whether the first configuration remains unchanged and whether the user equipment has received a downlink medium access control message indicating that a radio resource control configuration has been removed at the source access node without explicit radio resource control reconfiguration signaling;
   using or ceasing from using, by the user equipment, the protocol based on the determination; and
   waiting, based on the downlink medium access control message, to use a data loading control protocol in a new cell until the user equipment receives a separate data loading control information signal subsequent to handover to the new cell completing.

4. The method of claim 3, further comprising:
   ceasing from using the protocol when the first configuration remains unchanged by a handover command.

5. The method of claim 4, further comprising:
   subsequently receiving a second configuration indicating a protocol support, and using the protocol again based on the received second configuration.

6. The method of claim 5, wherein the second configuration is the same as the first configuration.

7. The method of claim 5, wherein the second configuration is different from the first configuration.

8. The method of claim 7, wherein when the second configuration is different from the first configuration, the second configuration is considered valid if a measurement identity is not activated.

9. The method of claim 3, further comprising:
   using the protocol upon receiving a configuration after the handover indicating support of the protocol.

10. The method of claim 3, further comprising:
    receiving the downlink medium access control message and deleting the radio resource control configuration at the user equipment.

11. A computer program product embodied on a non-transitory computer readable medium encoded with instructions that, when executed in hardware, perform the method according to claim 3.

12. An apparatus, comprising:
    at least one processor; and
    at least one memory including computer program code,
    wherein the at least one memory and the computer program code are configured to, with the at least one processor, cause the apparatus at least to
    configure, by an access node, a user equipment with a first protocol support indication configuration; and
    when the access node receives an uplink protocol indication from the user equipment, remove, by the access node, a radio resource control configuration,
    wherein the removal is done without performing any explicit radio resource control reconfiguration signaling,
    wherein the removal comprises replying with a downlink medium access control message, wherein the downlink medium access control message confirms that the radio resource control configuration has been deleted, wherein the downlink medium access control message is configured to cause the user equipment to wait to use a data loading control protocol in a new cell until the user equipment receives a separate data loading control information signal subsequent to handover to the new cell completing.

* * * * *